(12) United States Patent
Jung (10) Patent No.: US 7,489,957 B2
(45) Date of Patent: *Feb. 10, 2009

(54) MOBILE TERMINAL

(75) Inventor: Kwang Shin Jung, Gwangmyeong (KR)

(73) Assignee: LG Electronics, Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/312,424

(22) Filed: Dec. 21, 2005

(65) Prior Publication Data

US 2006/0094483 A1 May 4, 2006

Related U.S. Application Data

(63) Continuation of application No. 10/091,491, filed on Mar. 7, 2002, now Pat. No. 6,999,803.

(30) Foreign Application Priority Data

Mar. 8, 2001 (KR) ............................. 2001-12027

(51) Int. Cl.
*H04M 1/00* (2006.01)
*H04B 1/38* (2006.01)

(52) U.S. Cl. ............... 455/575.3; 455/575.1; 455/575.8; 455/550.1; 455/90.3; 379/433.13

(58) Field of Classification Search ............... 455/575.1, 455/575.3, 575.8, 550.1, 91.3; 379/433.13
See application file for complete search history.

(56) References Cited

U.S. PATENT DOCUMENTS

| | | | | |
|---|---|---|---|---|
| 5,401,091 A | | 3/1995 | Landry | |
| 5,706,332 A | * | 1/1998 | Nagai | 455/575.3 |
| 5,995,599 A | * | 11/1999 | Dunn et al. | 379/93.37 |
| 6,011,699 A | * | 1/2000 | Murray et al. | 361/814 |
| D440,955 S | | 4/2001 | Tanaka et al. | |
| 6,411,505 B1 | * | 6/2002 | DiFonzo et al. | 361/683 |
| 6,414,840 B2 | | 7/2002 | Suzuki | |
| 6,438,228 B1 | * | 8/2002 | Jeong et al. | 455/569.1 |
| 6,704,585 B1 | * | 3/2004 | Hiebel | 455/575.3 |

FOREIGN PATENT DOCUMENTS

| | | |
|---|---|---|
| JP | 06-224816 | 8/1994 |
| JP | 11-112629 | 4/1999 |
| KR | 2000-0012304 | 7/2000 |

* cited by examiner

*Primary Examiner*—Matthew D. Anderson
*Assistant Examiner*—Wen W Huang
(74) *Attorney, Agent, or Firm*—Birch, Stewart, Kolasch & Birch, LLP

(57) ABSTRACT

In a mobile terminal capable of preventing its breakage or damage by absorbing a shock of a contact between a folder and a main body in unfolding or folding of the folder by installing a buffer member to contact portions of the folder and the main body, a mobile terminal includes a main body housing a circuit substrate inside and having an operational button on the front surface, a folder rotatively connected to the main body and having a liquid screen, a hinge connecting unit for rotatively connecting the main body and the folder, and a buffer means for absorbing a shock of a contact between the main body and the folder when the folder is unfolded.

40 Claims, 6 Drawing Sheets

MOBILE TERMINAL

This application is a Continuation Application of application Ser. No. 10/091,491 filed Mar. 7, 2002 now U.S. Pat. No. 6,999,803, the entirety of which is incorporated herein by reference.

BACKGROUND OF THE INVENTION

1. Field of the Invention

The present invention relates to a mobile terminal, and in particular to a mobile terminal which is capable of absorbing a shock of a contact of a folder and a main body when the folder is unfolded/folded.

2. Description of the Prior Art

Generally, in a folder type mobile terminal a display liquid screen can be largely formed on a folder, accordingly these days a folder type mobile terminal is widely used.

Figure 1:
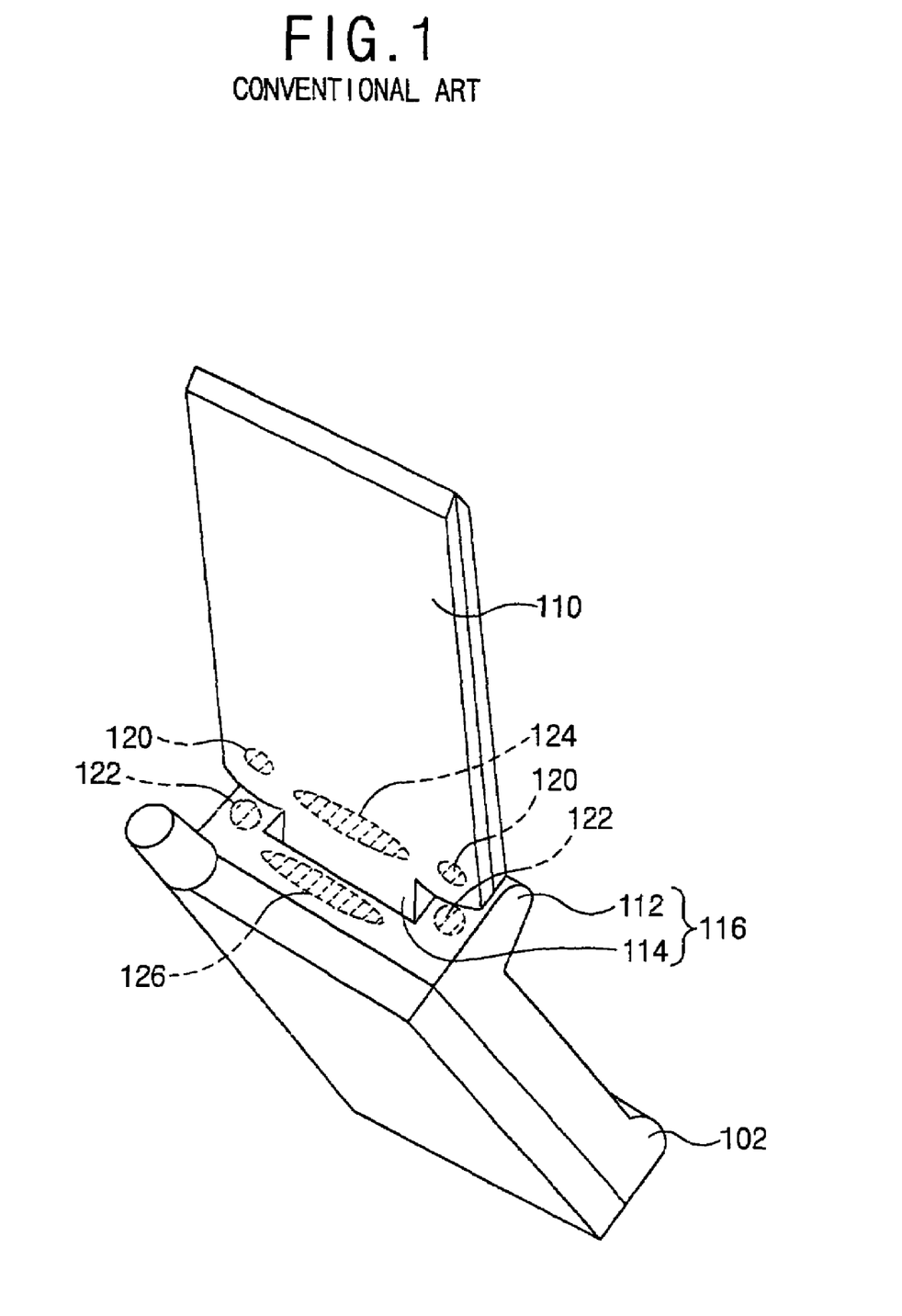
FIG. 1 is a perspective view illustrating the rear of a folder type mobile terminal in accordance with the conventional art.
Figure 2:
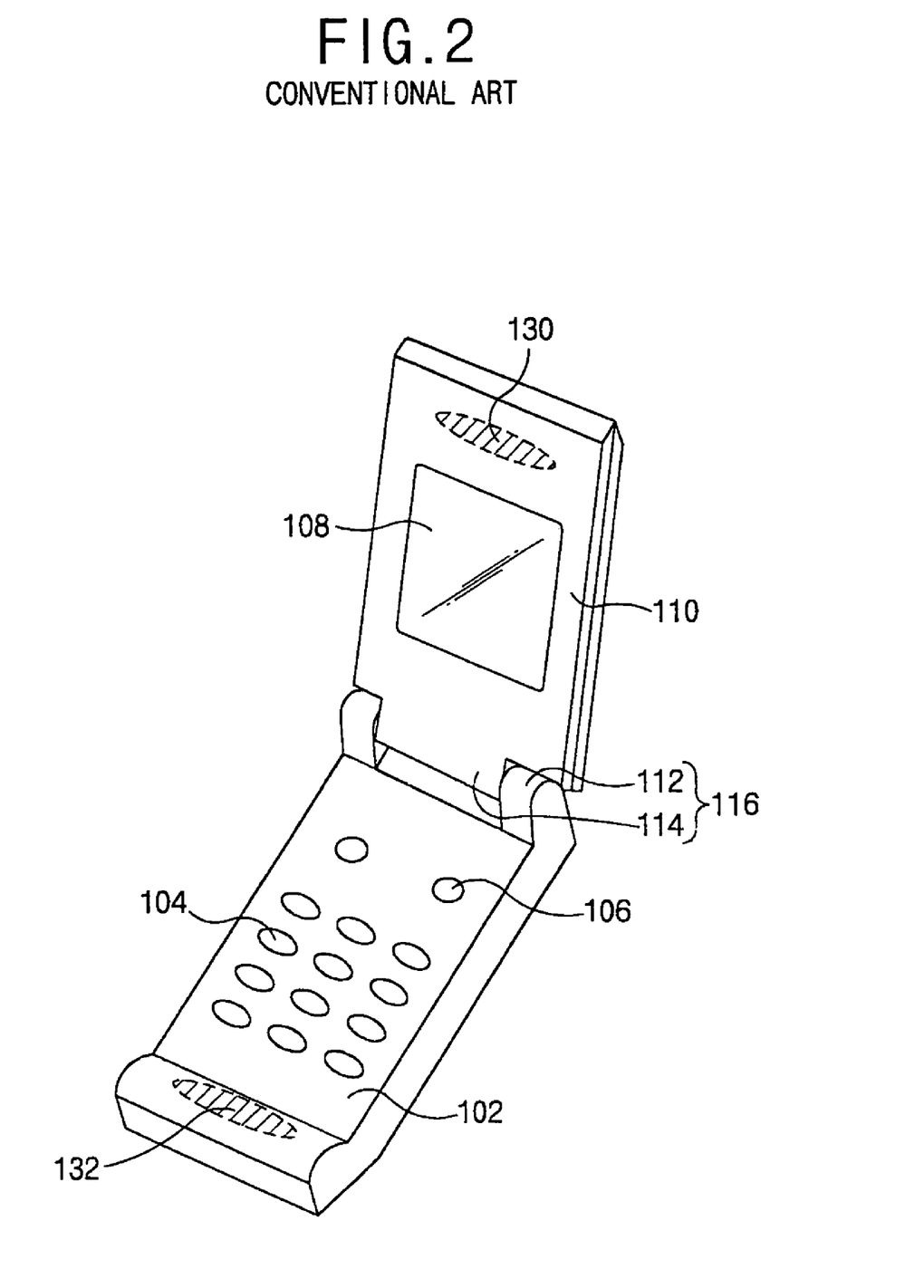
FIG. 2 is a perspective view illustrating the front of the folder type mobile terminal in accordance with the conventional art.

FIG. 1 is a perspective view illustrating the rear of a folder type mobile terminal in accordance with the prior art, and FIG. 2 is perspective view illustrating the front of a folder type mobile terminal in accordance with the prior art.

The conventional folder type mobile terminal includes a main body housing a circuit substrate inside and having a menu button 106 and a dial button 104 on the front surface, a folder 110 rotatively connected to the main body 102 and having a liquid screen 108 on the front surface, and a hinge connecting unit 116 rotatively connecting the main body 102 and the folder 110.

The hinge connecting unit 116 is constructed with a hinge bracket 112 projected from the upper both side portions of the main body 102 and being connected each other by a hinge pin (not shown) and a cylindrical hinge unit 114 projected from the upper portion of the folder 110, being inserted into a space between the both hinge bracket 112 and rotatively installed to the hinge bracket 112 by the hinge pin. And, because a spring (not shown) is arranged inside the cylindrical hinge unit 114, when the folder 110 is rotated over a certain angle in the unfolding/folding operation, the spring provides an elastic force in a direction the folder 110 is unfolded/folded.

In the unfolding/folding operation of the folder type mobile terminal, in order to use the terminal, when a user rotates the folder 110 over a certain angle in the direction the folder 110 is unfolded, the elastic force of the spring works in the same direction, accordingly the folder 110 is unfolded. Herein, because a certain portion of the folder 110 and a certain portion of the main body 102 are contacted each other, it prevents the folder 110 from being unfolded over a certain angle.

Herein, a shock occurs on contact portions of the folder 110 and the main body 102. In more detail, as depicted in FIG. 1, the shock occurs when the both corner portions 120 of the hinge unit 114 and the upper portion 122 of the hinge bracket 112 are contacted each other, and the shock occurs when the centrical portion 124 of the hinge unit 114 of the folder 110 and the centrical portion 126 of the hinge bracket 112 of the main body 102 are contacted each other.

And, when the user finishes the usage of the terminal, the user rotates the folder 110 over the certain angle in the folded direction, the elastic force of the spring works in the same direction, accordingly the folder 110 is folded.

Herein, when the folder 110 is folded, a shock occurs on the contact portion of the folder 110 and the main body 102 by the elastic force of the spring. In more detail, as depicted in FIG. 2, when the folder 110 is folded, the front upper portion 130 of the folder 110 and the front lower portion 132 of the main body 102 are contacted each other, herein a shock occurs on the contact portions by the elastic force of the spring.

As described above, in the conventional folder type mobile terminal, a shock occurs on contact portions of a folder and a main body in unfolding/folding operation of the folder, the shock may be transmitted to an operational circuit of the main body or a liquid screen of the folder, due to that its breakage or damage may occur, according to an increase of the number of operation times the contact portions may be worn away, combination between the folder and the main body may be weakened, accordingly the unfolding/folding operation may not be performed smoothly.

SUMMARY OF THE INVENTION

In order to solve the above-mentioned problems, it is an object of the present invention to provide a mobile terminal which is capable of preventing its breakage or damage by absorbing a shock of a contact of a folder and a main body in an unfolding operation of the folder by installing a buffer member on contact portions of the folder and the main body.

It is another object of the present invention to provide a mobile terminal which is capable of preventing its breakage or damage by absorbing a shock of a contact of a folder and a main body in a folding operation of the folder by installing a buffer member on contact portions of the folder and the main body.

A mobile terminal in accordance with a first embodiment of the present invention includes a main body housing a circuit substrate inside and having an operational button on the front surface, a folder rotatively connected to the main body and having a liquid screen, a hinge connecting unit for rotatively connecting the main body and the folder, and a buffer means for absorbing a shock of a contact between the main body and the folder when the folder is unfolded.

The buffer means is a buffer member installed to a certain portion of the main body so as to contact to a certain portion of the folder contacted to the main body when the folder is unfolded.

The buffer member is constructed with a first buffer member installed to the upper centrical portion of the main body so as to contact to the lower centrical portion of the folder when the folder is unfolded and a second buffer member respectively installed to the both sides of the upper end of the main body so as to contact to the both sides of the lower end of the folder.

A first installation groove is formed at the upper internal corner of the main body in order to insert the first buffer member into, and a second installation groove is formed at the upper both side portions projected from the main body in order to insert the second buffer member into.

The first buffer member has the same shape as the first installation groove so as to be inserted into the first installation groove formed at the main body, and a bridging hook is formed at the internal surface of the first buffer member so as to be inserted into a fixation hole formed at the first installation groove in order to prevent the first buffer member from being detached from the first installation groove.

The second buffer member has the same shape as the second installation groove so as to be inserted into the second installation groove, and a bridging hook is formed at the internal surface of the second buffer member so as to be inserted into a fixation hole formed at the second installation groove in order to prevent the second buffer member from being detached from the second installation groove.

The first buffer member having a certain width is projected from the first installation groove, and the second buffer member having a certain width is projected from the second installation groove.

The first buffer member and the second buffer member are made of rubber materials.

A mobile terminal in accordance with a second embodiment of the present invention includes a main body housing a circuit substrate inside and an operational button, a folder rotatively connected to the main body and having a liquid screen, a hinge connecting unit for rotatively connecting the main body and the folder; and a buffer means for absorbing a shock of a contact between the main body and the folder when the folder is folded.

The buffer means is a third buffer member installed to the upper front surface of the folder in order to absorb a shock by contacting to a certain side of the main body when the folder is folded.

The buffer means is a fourth buffer member formed at the lower front surface of the main body in order to absorb a shock by contacting to a certain side of the folder when the folder is folded.

The buffer means is constructed with the third buffer member installed to the folder and the fourth buffer member installed to the main body which are contacted each other in folding of the folder.

The buffer means is made of rubber materials.

A mobile terminal in accordance with a third embodiment of the present invention includes a main body housing a circuit substrate inside and having an operational button, a folder rotatively connected to the main body and having a liquid screen, a hinge connecting unit for rotatively connecting the main body and the folder, a first buffer means for absorbing a shock of a contact between the main body and the folder when the folder is unfolded, and a second buffer means for absorbing a shock of a contact between the main body and the folder when the folder is folded.

In a mobile terminal including a main body housing a circuit substrate inside and having an operational button and a liquid screen on the front surface and a flip rotatively connected to the main body and covering the operational button of the main body, a mobile terminal in accordance with the present invention includes a buffer means installed to contact portions of the flip and the main body.

The buffer means is a buffer member installed to the internal surface of the flip.

The buffer means is a buffer member installed to the front surface of the main body.

The buffer means is a buffer member respectively installed to the internal surface of the flip and the front surface of the main body.

The buffer means is made of rubber materials.

BRIEF DESCRIPTION OF THE DRAWINGS

The accompanying drawings, which are included to provide a further understanding of the invention-and are incorporated in and constitute a part of this specification, illustrate embodiments of the invention and together with the description serve to explain the principles of the invention.

In the drawings.

DETAILED DESCRIPTION OF THE PREFERRED EMBODIMENT

Hereinafter, embodiments of the present invention will be described with reference to accompanying drawings.

A plurality of embodiments of a folder type mobile terminal in accordance with the present invention can exist, hereinafter the preferred embodiment of the present invention will be described.

Figure 3:
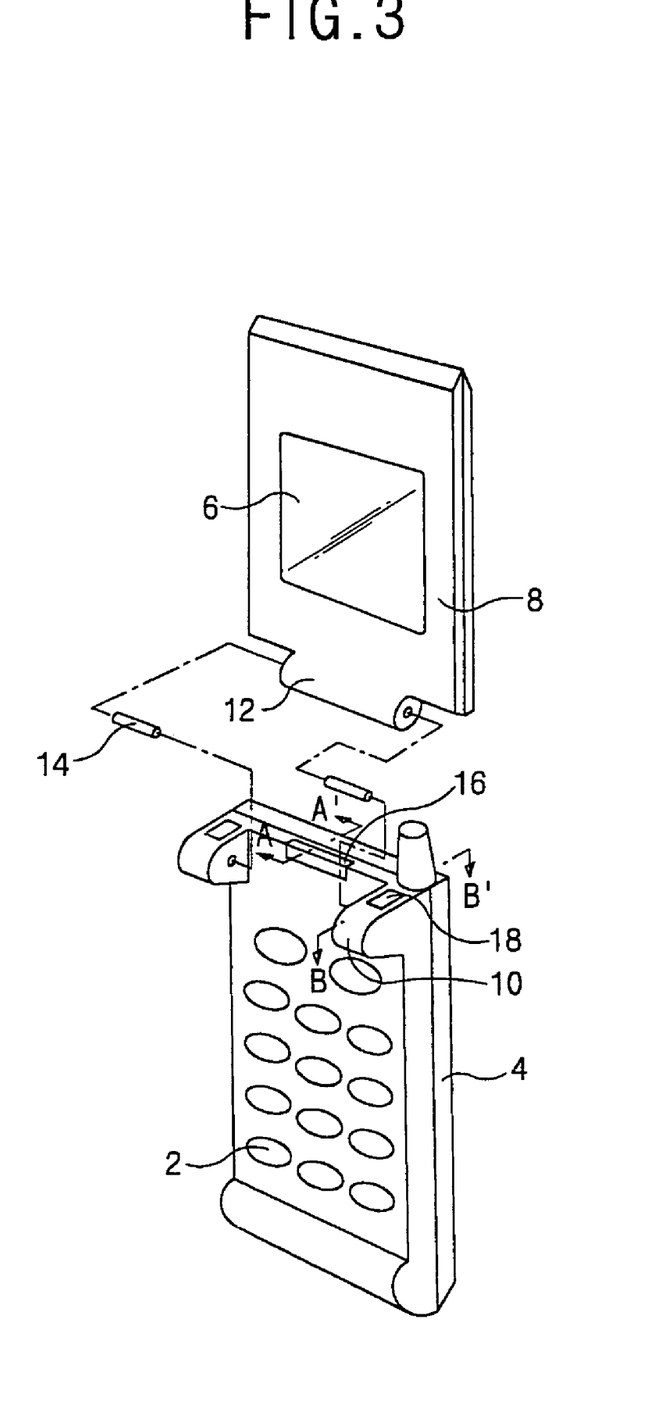
FIG. 3 is a disassembled perspective view illustrating a folder and a main body in accordance with a first embodiment of the present invention.
Figure 4:
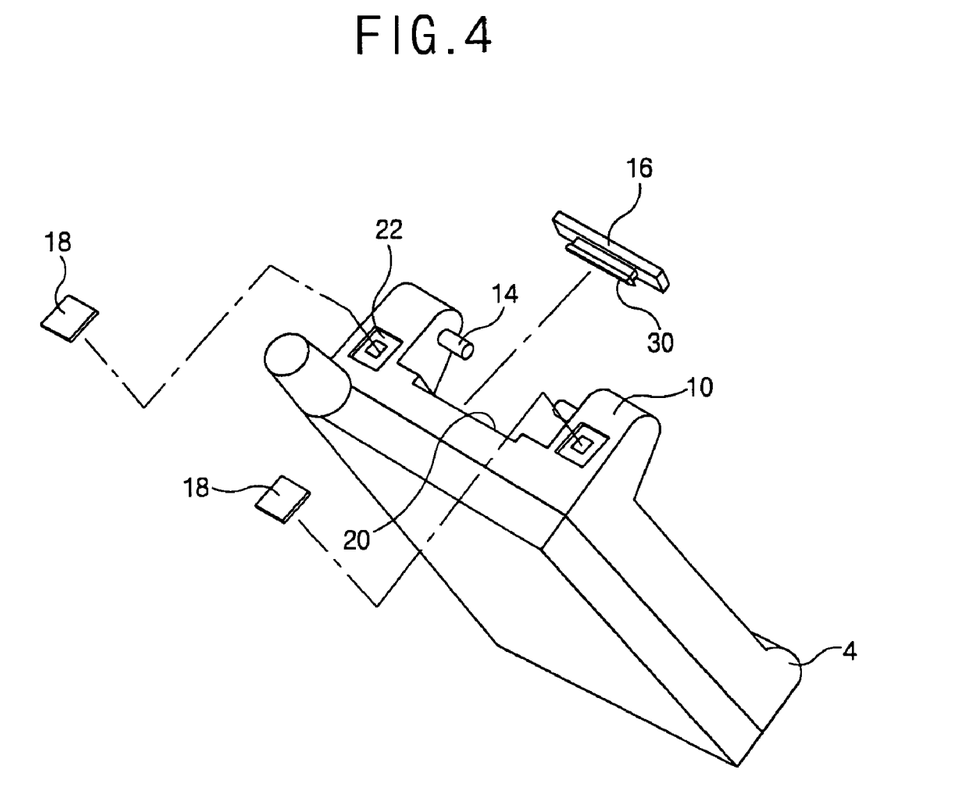
FIG. 4 is a disassembled perspective view illustrating a buffer means and a main body of a folder type mobile terminal in accordance with the first embodiment of the present invention.

FIG. 3 is a disassembled perspective view illustrating a folder and a main body in accordance with the first embodiment of the present invention, and FIG. 4 is a disassembled perspective view illustrating a buffer means of a main body of a folder type mobile terminal in accordance with the first embodiment of the present invention.

A folder type mobile terminal in accordance with the first embodiment of the present invention includes a main body 4 housing an operational substrate inside and having an operational button 2 on the front surface, a folder 8 rotatively connected to the main body 4 and having a liquid screen 6, a hinge connecting unit rotatively connecting the main body 4 and the folder 8, and a buffer means to absorb a shock of a contact of the main body 4 and the folder 8 in an unfolding operation of the folder 8.

The hinge connecting unit is constructed with a hinge bracket 10 projected from the upper both side portions of the main body 4 and a hinge unit 12 projected from the upper end portion of the folder 8, placed between both of the hinge bracket 10 and rotatively installed to the hinge bracket 10 by a hinge pin 14.

And, because a spring (not shown) is placed inside the hinge unit 12, when the folder 8 is unfolded over a certain angle, the elastic force is provided in an unfolded direction, and when the folder 8 is folded over a certain angle, the elastic force is provided in a folded direction.

The buffer means is constructed with a plurality of buffer members installed to contact portions of the folder 8 and the main body 4 in the unfolding operation of the folder 8 in order to absorb a shock on the contact portions of the folder 8 and the main body 4 occurred by the elastic force of the spring.

In the plurality of buffer members, a first buffer member 16 is installed to the upper centrical portion of the main body 4 so as to contact to the centrical portion of the hinge unit 12 of the folder 8 when the folder 8 is in the unfolded state, and a second buffer member 18 is respectively installed on the both upper portions of the hinge bracket 10 of the main body 4 so as to contact to the both upper portions of the hinge unit 12.

A first installation groove 20 for installing the first buffer member 16 is formed on the upper internal corner portion of the main body 4, and a second installation groove 22 for installing the second buffer member 18 is respectively formed on the both upper portions of the hinge bracket 10 projected from the main body 4.

Figure 5:
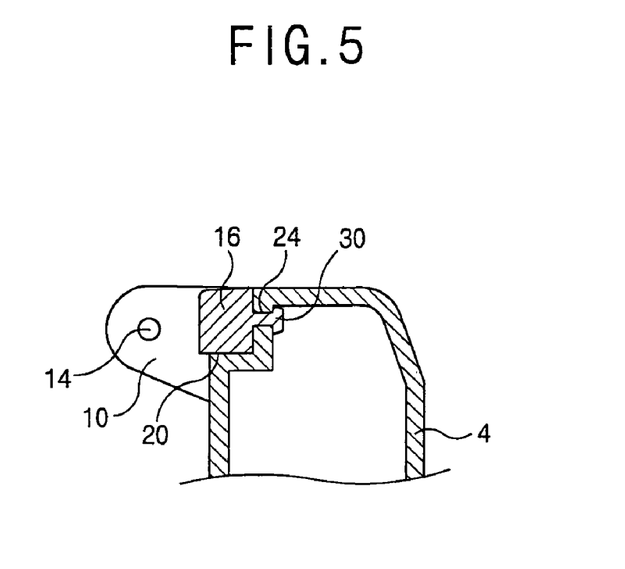
FIG. 5 is a sectional view taken along the line A-A of FIG. 3.
Figure 6:
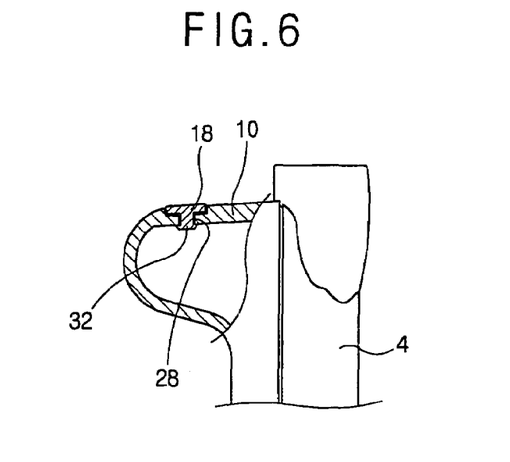
FIG. 6 is a sectional view taken along the line B-B of FIG. 3.

Herein, as depicted in FIG. 5, the first installation groove 20 has a quadrilateral shape, and a fixation hole 24 at which the first buffer member 16 is fixed is formed on the internal surface of the first installation groove 20. And, as depicted in FIG. 6, the second installation groove 22 has a quadrilateral shape, and a fixation hole 28 at which the second buffer member 18 is fixed is formed on the internal surface of the second installation groove 22.

The first buffer member 16 has a quadrilateral shape so as to be inserted into the first installation groove 20, and a bridging hook 30 for being combined with the fixation hole 24 of the first installation groove 20 is formed on the internal surface of the first buffer member 16 in order to prevent the first buffer member 16 from being detached from the first installation groove 20. And, in order to perform the buffer operation smoothly in contact with the certain portion of the folder 8, it is preferable for the first buffer member 16 projected from the first installation groove 20 to have a certain width.

The second buffer member 18 has a quadrilateral shape so as to be inserted into the second installation groove 22, and a bridging hook 32 for being combined with the fixation hole 28 of the second installation groove 22 is formed in the internal surface of the second buffer member 18 in order to prevent the second buffer member 18 from being detached from the second installation groove 22. And, in order to perform the buffer operation smoothly in contact with the contact portion of the folder 8, it is preferable for the second buffer member 18 projected from the upper portion of the hinge bracket 10 to have a certain width.

It is preferable for the first buffer member 16 and the second buffer member 18 to be made of rubber materials suitable for absorbing the shock in contact with the folder 8.

And, the first buffer member 16 and the second buffer member 18 can have various shapes such as a circular shape or an oval figure, etc., and the first installation groove 20 and the second installation groove 22 can have various shapes according to shapes of the first buffer member 16 and the second buffer member 18.

In the folder type mobile terminal in accordance with the present invention, when the user rotates folder 8 over a certain angle in order to use the terminal, the elastic force of the spring works in the unfolded direction, accordingly the folder 8 is unfolded.

When the folder 8 is in the unfolded state, the lower central portion of the folder 8 contacts with the first buffer member 16 installed to the main body 4. Herein, the first buffer member 16 absorbs the shock of the contact.

And, when the folder 8 is in the unfolded state, the both sides of the lower end of the folder 8 is contacted to the second buffer member 18 installed to the hinge bracket 10. Herein, the second buffer member 18 absorbs the shock of the contact.

Figure 7:
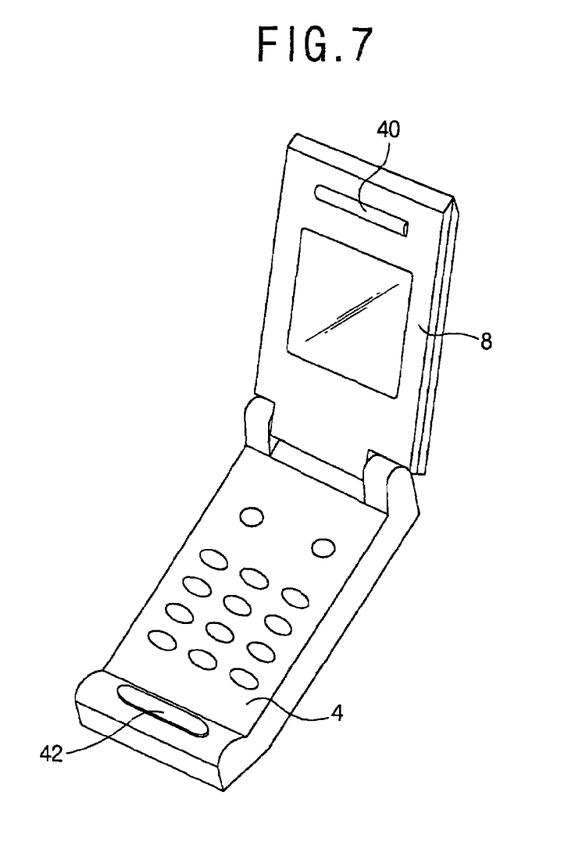
FIG. 7 is a perspective view illustrating a folder type mobile terminal in accordance with a second embodiment of the present invention.

FIG. 7 is a perspective view illustrating a folder type mobile terminal in accordance with a second embodiment of the present invention.

A folder type mobile terminal in accordance with the second embodiment of the present invention includes a buffer means for absorbing a shock of a contact of the folder 8 and the main body 4 when the user folds the folder 8 after finishing the usage of the terminal.

The buffer means is constructed with at least one buffer member installed on contact portions of the folder 8 and the main body 4 in the folded state in order to absorb a shock of a contact of the folder 8 and the main body 4 in the folded state.

In more detail, the buffer means can be constructed with a third buffer member 40 installed to the upper front surface of the folder 8 so as to contact with the contact portion of the main body 4 or a fourth buffer member 42 installed to the lower front surface of the main body 4 so as to contact with the contact portion of the folder 8 or both of the third buffer member 40 installed to the folder 8 and the fourth buffer member 42 installed to the main body 4 so as to contact each other.

Herein, it is preferable for the third and the fourth buffer members 40, 42 respectively projected from the upper surface of the folder 8 and the main body 4 to be made of rubber materials.

And, the third buffer member 40 and the fourth buffer member 42 can have various shapes such as a circular shape or an oval figure.

In the folder type mobile terminal in accordance with the second embodiment of the present invention, after the user finishes the usage of the terminal, the user rotates the folder 8 over a certain angle in the folded direction, the elastic force of the spring works on the folded direction, accordingly the folder 8 is folded.

Herein, when the folder 8 is folded, in the installation of the third buffer member 40, the third buffer member 40 is contacted to the contact portion of the main body 4, accordingly the third buffer member 40 absorbs the shock of the contact in the folding of the folder 8.

And, if the fourth buffer member 42 is installed to the main body 4, the fourth buffer member 42 is contacted to the contact portion of the folder 8, accordingly the fourth buffer member 42 absorbs the shock of the contact in the folding of the folder 8.

And, if the third buffer member 40 is installed to the folder 8 and the fourth buffer member 42 is installed to the main body 8, the third buffer member 40 and the fourth buffer member 42 are contacted each other, accordingly they absorbs the shock of the contact in the folding of the folder 8.

Figure 8:
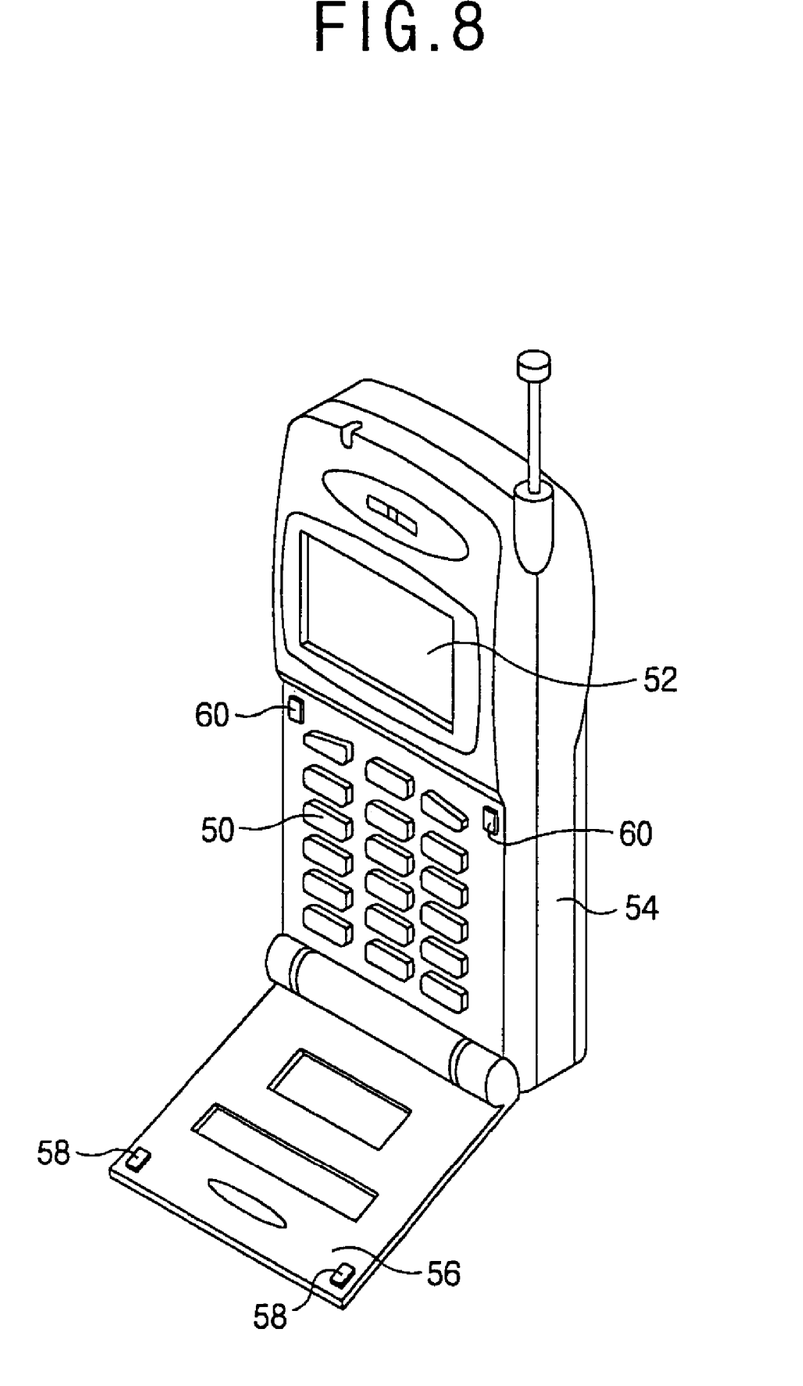
FIG. 8 is a perspective view illustrating a flip type mobile terminal in accordance with a third embodiment of the present invention.

FIG. 8 is a perspective view illustrating a flip type mobile terminal in accordance with a third embodiment of the present invention.

A flip type mobile terminal in accordance with the third embodiment of the present invention includes a main body 54 housing a circuit substrate inside and having a liquid screen 52 and a operational button 50 on the front surface, a flip 56 rotatively connected to the main body 54 and covering the operational button 50, and a buffer means installed to contact portions of the flip 56 and the main body 54 in unfolding/folding operation of the flip 56 in order to absorb a shock of a contact in the unfolding/folding operation of the flip 56.

The buffer means can be constructed as a buffer member 58 installed to the internal surface of the flip 56 in order to absorb a shock of a contact of the flip 56 and the main body 54 or a buffer member 60 installed to a certain portion of the front surface of the main body 54 at which the operational button 50 is projected.

The buffer means can include both of the buffer members 58, 60 respectively installed to the internal surface of the flip 56 and the front surface of the main body 54.

As described above, in a mobile terminal in accordance with the present invention, when a user rotates a folder over a certain angle in an unfolded direction in order to use a terminal, an elastic force of a spring works on the unfolded direction, accordingly the folder is unfolded. Herein, a first buffer member and a second buffer member are contacted each other when the folder is unfolded, accordingly they absorb a shock of a contact, accordingly a breakage or a damage of the terminal can be prevented.

In addition, after finishing the usage of the terminal, when the user rotates the folder over a certain angle in a folded direction, the elastic force of the spring works in the folded direction, accordingly the folder is folded. Herein, by installing a third buffer member to the folder so as to contact to a certain portion of the main body or installing a fourth buffer member to the main body so as to contact to a certain side of the folder or installing both of the third buffer member and the fourth buffer member, a shock of a contact of the folder and the main body in the folding operation can be absorbed, accordingly a breakage or a damage of the terminal can be prevented.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

I claim:

1. A handheld mobile terminal comprising:
   a main body;
   a folder connected to the main body and having a display screen;
   a hinge connecting unit for rotatively connecting the main body and the folder, the hinge connecting unit to bias the folder into an unfolded position upon reaching a certain angle with respect to the main body; and
   a non-conductive buffer member provided at an exterior contact portion where the folder meets the main body when the folder is unfolded, the buffer member including a first buffer member to contact a portion of the folder when the folder is unfolded and a second buffer member provided at one side of the main body to contact the folder when the folder is unfolded, the first buffer member to absorb shock when the folder is unfolded and the second buffer member to absorb shock when the folder is unfolded,
   wherein the main body includes a first installation recess on the main body, and a first attachment recess adjoining the first installation recess;
   wherein the first buffer member includes a main body portion having an upper part and a lower part, the lower part being located within the first installation recess, the lower part having a similar shape as the first installation recess, the perimeter of the lower part being surrounded by the first installation recess, the upper part projecting from the first installation recess,
   wherein the first buffer member further includes an attachment portion extending from the lower part of the main body portion, the attachment portion being located within the first attachment recess to prevent the first buffer member from being detached from the first installation recess,
   wherein the main body includes a second installation recess on the main body, and a second attachment recess adjoining the second installation recess,
   wherein the second buffer member includes a main body portion having an upper part and a lower part, the lower part being located within the second installation recess, the lower part having a similar shape as the second installation recess, the perimeter of the lower part being surrounded by the second installation recess, the upper part projecting from the second installation recess, and
   wherein the second buffer member further includes an attachment portion extending from the lower part of the main body portion, the attachment portion being located within the second attachment recess to prevent the second buffer member from being detached from the second installation recess.

2. The handheld mobile terminal according to claim 1, wherein the first buffer member is provided at an upper portion of the main body.

3. The handheld mobile terminal according to claim 2, wherein the first installation recess comprises a first groove on the upper portion of the main body in order to receive the first buffer member, and the second installation recess comprises a second groove on the one side of the main body in order to receive the second buffer member.

4. The handheld mobile terminal according to claim 3, wherein the attachment portion of the first buffer member comprises a first bridging hook, and the first attachment recess comprises a first fixation hole into which the first bridging hook is fixedly inserted.

5. The handheld mobile terminal according claim 4, wherein the attachment portion of the second buffer member comprises a second bridging hook, and the second attachment recess comprises a second fixation hole into which the second bridging hook is fixedly inserted.

6. The handheld mobile terminal according to claim 2, wherein the second buffer member is provided at the upper portion of the main body.

7. The handheld mobile terminal according to claim 1, wherein the first buffer member comprises rubber and the second buffer member comprises rubber.

8. The handheld mobile terminal according to claim 1, wherein the hinge connecting unit includes at least one spring-loaded hinge.

9. The handheld mobile terminal according to claim 1, wherein the hinge connecting unit is provided at least at one side of the main body.

10. The handheld mobile terminal according to claim 1, wherein the hinge connecting unit is provided at least at two sides of the main body.

11. The handheld mobile terminal according to claim 1, wherein the hinge connecting unit is provided at one end of the folder.

12. The handheld mobile terminal according to claim 1, wherein the first buffer member is provided at one side of the main body to contact the folder when the folder is unfolded.

13. The handheld mobile terminal according to claim 12, wherein the second buffer member is provided at another side of the main body to contact the folder when the folder is unfolded.

14. The handheld mobile terminal according to claim 1, wherein the main body includes an antenna that protrudes from the main body.

15. The handheld mobile terminal according to claim 1, wherein the main body includes an antenna that is for wireless communications.

16. The handheld mobile terminal according to claim 1, wherein the main body includes less than 26 keys.

17. A handheld mobile terminal comprising:
    a main body;
    a folder having a display screen;
    a hinge connecting unit to connect the main body and the folder, the hinge connecting unit to bias the folder into an unfolded position upon reaching a certain angle with respect to the main body; and a non-conductive first buffer member at a first exterior contact portion proximal to the hinge connecting unit, the first contact portion being an area that the folder meets the main body when the folder is unfolded relative to the main body, the first buffer member to absorb shock when the folder is unfolded relative to the main body, wherein the first contact portion comprises an end portion of the main body proximal to the hinge connecting unit, wherein the main body includes a first installation recess on the main body, and a first attachment recess adjoining the first installation recess;

wherein the first buffer member includes a main body portion having an upper part and a lower part, the lower part being located within the first installation recess, the lower part having a similar shape as the first installation recess, the perimeter of the lower part being surrounded by the first installation recess, the upper part projecting from the first installation recess, wherein the first buffer member further includes an attachment portion extending from the lower part of the main body portion, the attachment portion being located within the first attachment recess to prevent the first buffer member from being detached from the first installation recess.

18. The handheld mobile terminal of claim 17, further comprising:

a non-conductive second buffer member at a second exterior contact portion proximal to an end of the main body opposite the hinge connecting unit, the second contact portion being an area that the folder meets the main body when the folder is folded relative to the main body, the second buffer member to absorb shock when the folder is folded relative to the main body, wherein the main body includes a second installation recess on the main body, and a second attachment recess adjoining the second installation recess, wherein the second buffer member includes a main body portion having an upper part and a lower part, the lower part being located within the second installation recess, the lower part having a similar shape as the second installation recess, the perimeter of the lower part being surrounded by the second installation recess, the upper part projecting from the second installation recess, and wherein the second buffer member further includes an attachment portion extending from the lower part of the main body portion, the attachment portion being located within the second attachment recess to prevent the second buffer member from being detached from the second installation recess.

19. The handheld mobile terminal of claim 17, wherein the first contact portion comprises an upper central portion of the main body.

20. The handheld mobile terminal according to claim 17, wherein the hinge connecting unit includes at least one spring-loaded hinge.

21. The handheld mobile terminal according to claim 17, wherein the main body includes an antenna that protrudes from the main body.

22. A handheld mobile terminal comprising:
a main body;
a folder;
a hinge connecting unit to rotatively connect the main body and the folder, and the hinge connecting unit to bias the folder into an unfolded position upon reaching a certain angle with respect to the main body;

a non-conductive first buffer member provided at an upper exterior portion of the main body so as to contact a lower portion of the folder when the folder is unfolded; and a non-conductive second buffer member provided at an exterior portion of the main body to contact the folder when the folder is unfolded relative to the main body, wherein the main body includes a first installation recess on the main body, and a first attachment recess adjoining the first installation recess;

wherein the first buffer member includes a main body portion having an upper part and a lower part, the lower part being located within the first installation recess, the lower part having a similar shape as the first installation recess, the perimeter of the lower part being surrounded by the first installation recess, the upper part projecting from the first installation recess, wherein the first buffer member further includes an attachment portion extending from the lower part of the main body portion, the attachment portion being located within the first attachment recess to prevent the first buffer member from being detached from the first installation recess, wherein the main body includes a second installation recess on the main body, and a second attachment recess adjoining the second installation recess, wherein the second buffer member includes a main body portion having an upper part and a lower part, the lower part being located within the second installation recess, the lower part having a similar shape as the second installation recess, the perimeter of the lower part being surrounded by the second installation recess, the upper part projecting from the second installation recess, and wherein the second buffer member further includes an attachment portion extending from the lower part of the main body portion, the attachment portion being located within the second attachment recess to prevent the second buffer member from being detached from the second installation recess.

23. The handheld mobile terminal according to claim 22, wherein the first buffer member is provided at a side portion of the main body.

24. The handheld mobile terminal according to claim 22, wherein the upper portion is an upper central portion of the main body.

25. The handheld mobile terminal according to claim 24, wherein the first buffer member and the second buffer member each comprise rubber.

26. The handheld mobile terminal according to claim 24, wherein the attachment portion of the first buffer member comprises a first bridging hook, and the first attachment recess comprises a first fixation hole into which the first bridging hook is fixedly inserted.

27. The handheld mobile terminal according to claim 26, wherein the attachment portion of the second buffer member comprises a second bridging hook, and the second attachment recess comprises a second fixation hole into which the second bridging hook is fixedly inserted.

28. The handheld mobile terminal according to claim 22, wherein the hinge connecting unit includes at least one spring-loaded hinge.

29. The handheld mobile terminal according to claim 22, wherein the main body includes an antenna that protrudes from the main body.

30. A handheld mobile terminal comprising:
a main body;

a folder having a display screen;

a hinge connecting unit to rotatively connect the main body to the folder and to bias the folder into an unfolded position upon reaching a certain angle with respect to the main body; and a non-conductive buffer member to absorb shock caused by impact of the folder and the main body when the folder is biased into an unfolded position relative to the main body, the buffer member including a first exterior buffer member and a second exterior buffer member, the second buffer member being different than the first buffer member, wherein the main body includes a first installation recess on the main body, and a first attachment recess adjoining the first installation recess;

wherein the first buffer member includes a main body portion having an upper part and a lower part, the lower part being located within the first installation recess, the lower part having a similar shape as the first installation recess, the perimeter of the lower part being surrounded by the first installation recess, the upper part projecting from the first installation recess, wherein the first buffer member further includes an attachment portion extending from the lower part of the main body portion, the attachment portion being located within the first attachment recess to prevent the first buffer member from being detached from the first installation recess, wherein the main body includes a second installation recess on the main body, and a second attachment recess adjoining the second installation recess, wherein the second buffer member includes a main body portion having an upper part and a lower part, the lower part being located within the second installation recess, the lower part having a similar shape as the second installation recess, the perimeter of the lower part being surrounded by the second installation recess, the upper part projecting from the second installation recess, and wherein the second buffer member further includes an attachment portion extending from the lower part of the main body portion, the attachment portion being located within the second attachment recess to prevent the second buffer member from being detached from the second installation recess.

31. The handheld mobile terminal of claim 30, wherein the first buffer member is provided at an upper portion of the main body to contact a portion of the folder when the folder is unfolded relative to the main body.

32. The handheld mobile terminal according to claim 31, wherein the second buffer member is provided at one side of the main body to contact the folder when the folder is unfolded relative to the main body.

33. The handheld mobile terminal according to claim 30, wherein the hinge connecting unit is provided at least at one side of the main body.

34. The handheld mobile terminal according to claim 30, wherein the first buffer member is provided at a first contact portion where the folder meets the main body when the folder is unfolded relative to the main body.

35. The handheld mobile terminal according to claim 30, wherein the hinge connecting unit includes at least one spring-loaded hinge.

36. The handheld mobile terminal according to claim 30, wherein the main body includes an antenna that protrudes from the main body.

37. A handheld mobile terminal comprising:

a main body;

a folder;

a hinge connecting unit to bias the folder into an unfolded position and to bias the folder into a folded position;

a non-conductive first buffer member at a first exterior contact portion, the first contact portion being an area of contact between the main body and the folder when the folder is unfolded, the first buffer member to absorb shock caused by impact of the folder and the main body when the folder is biased into an unfolded position; and a non-conductive second buffer member at a second exterior contact portion, the second contact portion being an area of contact between the main body and the folder when the folder is folded, the second buffer member to absorb shock caused by impact of the folder and the main body when the folder is biased into a folded position, wherein the main body includes a first installation recess on the main body, and a first attachment recess adjoining the first installation recess;

wherein the first buffer member includes a main body portion having an upper part and a lower part, the lower part being located within the first installation recess, the lower part having a similar shape as the first installation recess, the perimeter of the lower part being surrounded by the first installation recess, the upper part projecting from the first installation recess, wherein the first buffer member further includes an attachment portion extending from the lower part of the main body portion, the attachment portion being located within the first attachment recess to prevent the first buffer member from being detached from the first installation recess, wherein the main body includes a second installation recess on the main body, and a second attachment recess adjoining the second installation recess, wherein the second buffer member includes a main body portion having an upper part and a lower part, the lower part being located within the second installation recess, the lower part having a similar shape as the second installation recess, the perimeter of the lower part being surrounded by the second installation recess, the upper part projecting from the second installation recess, and wherein the second buffer member further includes an attachment portion extending from the lower part of the main body portion, the attachment portion being located within the second attachment recess to prevent the second buffer member from being detached from the second installation recess.

38. The handheld mobile terminal according to claim 37, further comprising:

a non-conductive third buffer member provided on the folder proximal to an end opposite the hinge connecting unit, the third buffer member to contact the second buffer member and to absorb shock when the folder is folded.

39. The handheld mobile terminal according to claim 37, wherein the hinge connecting unit includes at least one spring-loaded hinge.

40. The handheld mobile terminal according to claim 37, wherein the main body includes an antenna that protrudes from the main body.

* * * * *